April 11, 1961 — J. W. VOTH — 2,979,176
DOUBLE ACTING CLUTCH
Filed Oct. 27, 1958 — 3 Sheets-Sheet 1

Inventor
James W. Voth
By James A. Ulfson
Attorney

United States Patent Office 2,979,176
Patented Apr. 11, 1961

2,979,176

DOUBLE ACTING CLUTCH

James W. Voth, Springfield, Ill., assignor to Allis-Chalmers Manufacturing Company, Milwaukee, Wis.

Filed Oct. 27, 1958, Ser. No. 769,721

15 Claims. (Cl. 192—87)

This invention relates generally to fluid operated clutches and is more particularly concerned with a double acting fluid operated clutch for power shift transmissions and the like.

In designing transmissions for present day industrial type motor vehicles it is desirable to incorporate constant mesh gearing and quick shift features which allow the operator to change from one speed ratio to another without having to stop the vehicle or to actuate a master clutch mechanism. In keeping with present day requirements for quick shift type transmissions, double acting fluid operated multiple disk clutch devices have been suggested because of their compactness and unitary construction. Such clutch devices, however, must be designed to accomplish rapid speed change without transmitting shock to the gearing during frictional engagement of the sets of clutch disks; and in order to be practical they must be trouble free and have a simple construction.

Some conventional double acting multiple disk clutch designs provide a reciprocable actuator intermediate two stacks of clutch disks and a pair of pressure chambers on opposite ends of a pressure responsive reciprocable actuator. Each of the pairs of chambers has a restriction passage therebetween so the fluid pressure acts first in one and then in both which affords a time delay feature that is intended to promote a smooth operation as the actuator compresses one or the other of the stacks of clutch disks. Other more recent designs include the additional feature of a passageway between one of each pair of pressure chambers at opposite ends of the actuator so that during operation fluid in one of the contracting pressure chambers on one end of the actuator may be transferred into an expanding pressure chamber at the opposite end of the actuator in order to minimize the amount of fluid which must be supplied by the fluid pressure supply system in order to reduce the overall time required to fully engage the clutch. These conventional double acting clutch devices, however, have not been entirely satisfactory from the standpoint of overall efficiency, reliability and simplicity of construction.

It is, therefore, an object of the present invention to provide an improved double acting clutch mechanism of the character hereinbefore described which will take care of the foregoing requirements in an entirely satisfactory manner.

It is a further object of this invention to provide an improved clutch mechanism of the hereinbefore described character wherein a pressure responsive means is employed for automatically controlling the interval of fluid transfer from a contracting pressure chamber into an expanding pressure chamber.

It is a further object of this invention to provide an improved clutch mechanism of the hereinbefore described character wherein an automatic pressure responsive means is employed for automatically opening a fluid passage between a pressurized expanding pressure chamber at one end of a pressure responsive actuator and pressure chamber not pressurized but on the same end of the actuator so that fluid under pressure may be directed into both pressure chambers simultaneously, thereby providing a time delay feature in order to promote a smooth and positive actuation of the clutch.

It is another object of this invention to provide an improved mechanism of the character hereinbefore described for engaging an axially spaced pair of frictional gripping devices for a transmission wherein a pressure sensitive regulating means permits transfer of fluid from one of a pair of contracting pressure chambers to one of a pair of expanding pressure chambers and being responsive to fluid pressure in the other of said pair of expanding pressure chambers to automatically interrupt fluid transfer and alternatively open a passage between the pair of expanding pressure chambers so that pressurized fluid may be delivered to both simultaneously in order to provide a rapid, smooth and positive engagement of the clutch.

It is a further object of the present invention to provide an improved clutch mechanism of the hereinbefore described character which incorporates a simple spool valve means for automatically controlling the interval of fluid transfer between a contracting end and an expanding pressure chamber in order to reduce the overall time interval for actuating the clutch.

It is a further object of the present invention to provide an improved clutch mechanism of the hereinbefore described character which incorporates a simple spool valve means that automatically regulates the flow of pressurized fluid into first one and then both expanding pressure chambers on one end of an actuator to insure a controlled time delay interval thereby insuring rapid, smooth and positive compression of a stack of clutch disks.

It is a further object of the present invention to provide an improved mechanism for engaging a fluid operated double acting clutch which incorporates a simple spool valve means for permitting transfer of fluid from one of a pair of expanding pressure chambers in a working cylinder to one of a pair of contracting pressure chambers of an oppositely acting working cylinder as pressurized fluid is being directed into the other of said pair of expanding pressure chambers, the spool valve means being responsive to a predetermined pressure within the fluid supply system for automatically interrupting fluid transfer and alternatively directing pressurized fluid into both of the expanding pressure chambers simultaneously.

Other objects and advantages of the present invention will become apparent to those skilled in the art when the following specification is read in conjunction with the accompanying drawings wherein.

Figure 1:
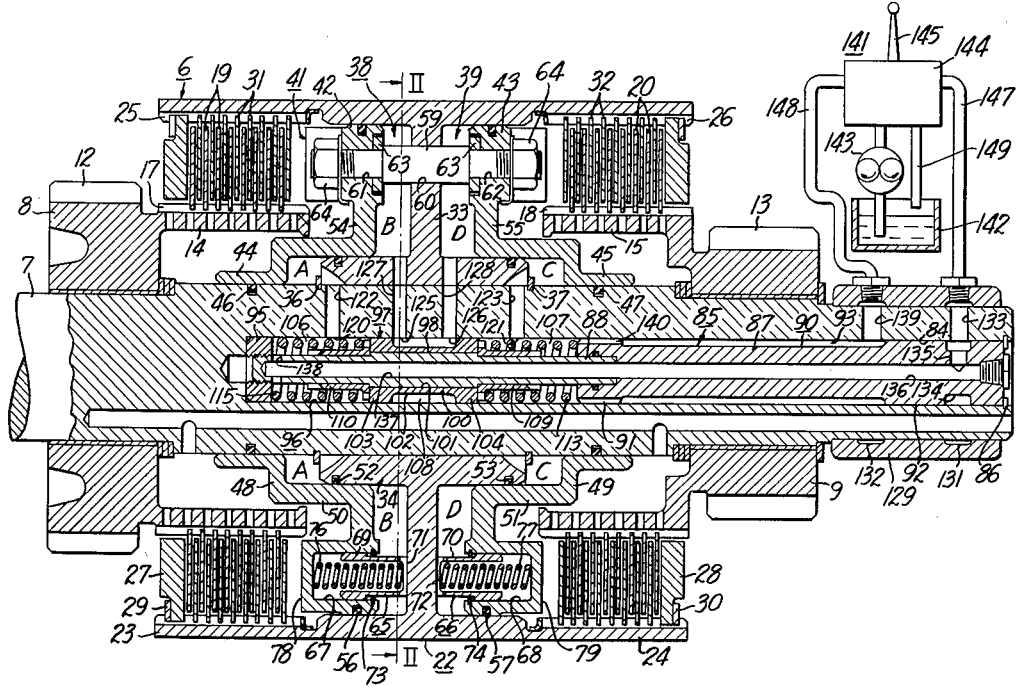
Fig. 1 shows a longitudinal sectional view through the double acting hydraulic clutch and the spool valve assembly and also shows a diagrammatically illustrated hydraulic fluid supply system for supplying pressurized fluid to actuate the clutch.
Figure 3:
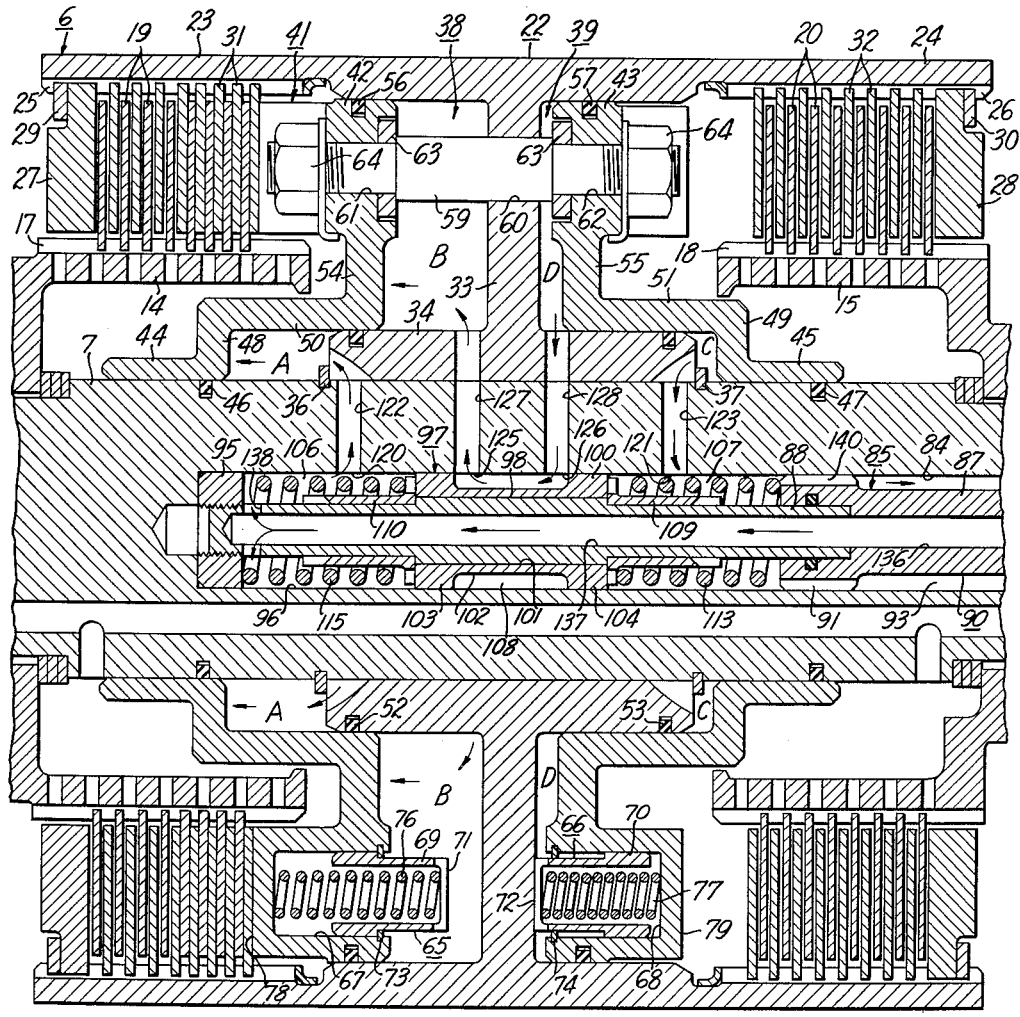
Figure 4:
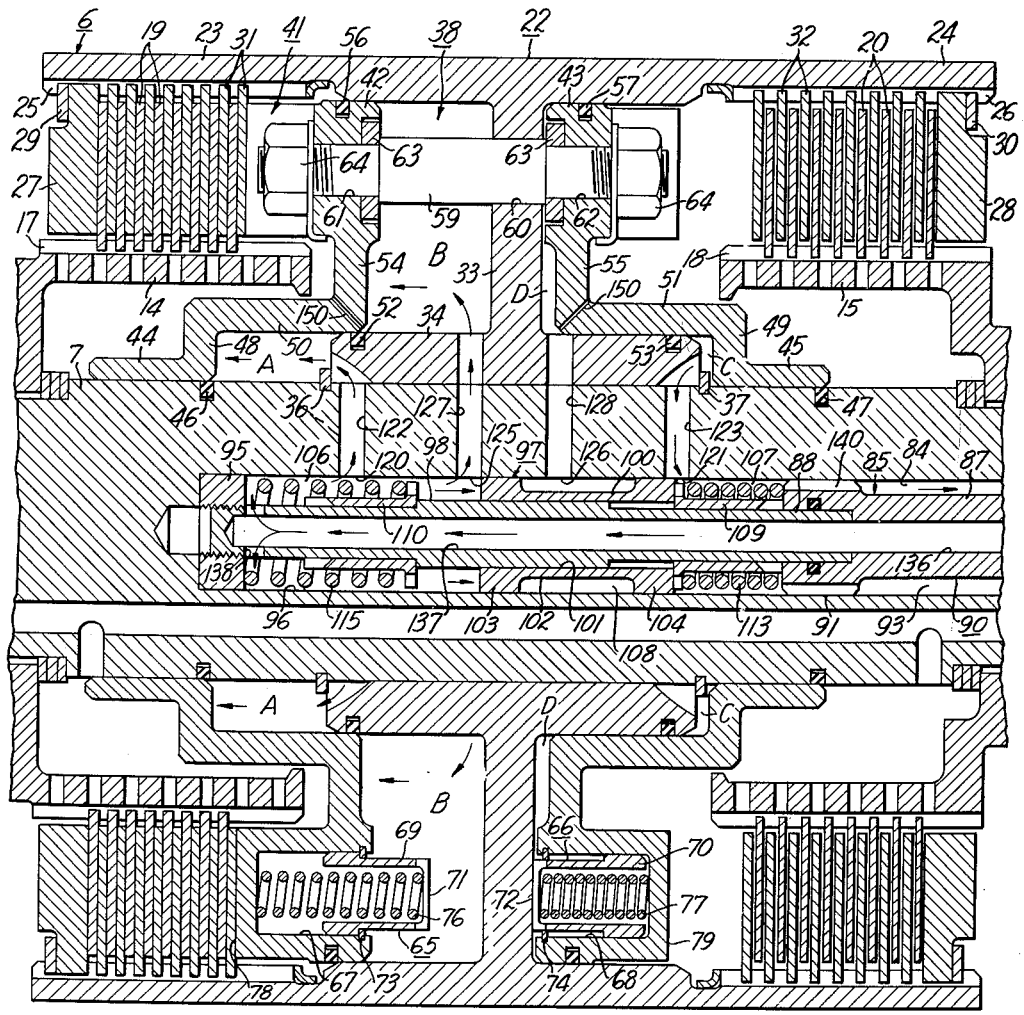

Fig. 3 is a sectional view of the double acting clutch shown in Fig. 1 showing pressurized fluid being directed into the radially inner pressure chamber of the left working cylinder displacing the actuator to the left and also showing the spool valve assembly in the neutral position allowing fluid transfer between the radially outer chambers of the working cylinders; and Fig. 4 is a sectional view of the double acting clutch shown in Fig. 3 wherein the spool valve is shifted to the right into an actuated position and pressurized fluid is being directed into both the radially inner and radially outer chamber of the left working cylinder simultaneously forcing the actuator leftward to fully compress the left stack of clutch disks.

Figure 2:
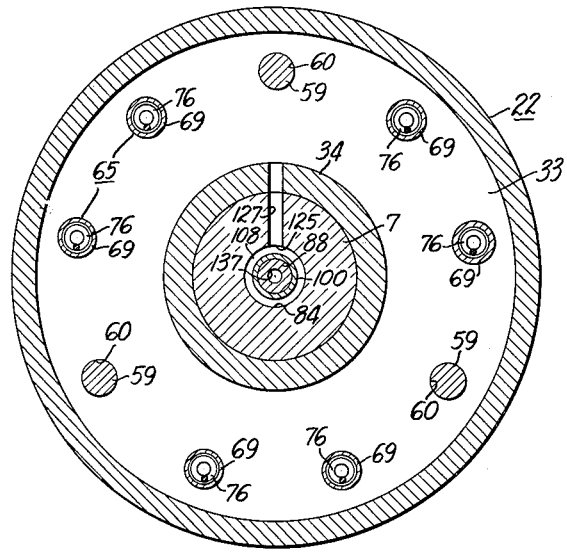
Fig. 2 is a sectional view of the double acting clutch taken along lines II—II in Fig. 1.

Referring to Figs. 1 and 2, a double fluid operated multiple disk clutch assembly indicated generally by the reference character 6 is mounted on the driven shaft 7 of a quick shift constant mesh type of transmission. The transmission referred to has a construction and operation that is well known in the art and is, therefore, not shown in detail. It should be understood, however, that it is not intended to limit the invention to a clutch for this type of transmission. A pair of driving members of the transmission, indicated generally by reference numerals 8 and 9, are rotatably mounted respectively upon drive shaft 7 in axially spaced relationship. Driving members 8 and 9, respectively, include spur gears 12 and 13 which are in constant mesh with complementary driving gears, not shown, of the transmission and also include annular flanges or driving drums 14 and 15. Drums 14 and 15, respectively, have a series of axially disposed circumferentially spaced splines 17 and 18 on their outer surfaces which carry a series of annular clutch disks 19 and 20 being slidable thereon and having internal teeth in driven engagement respectively with splines 17 and 18. A driven member, indicated generally by the reference numeral 22, includes an annular flange which provides a pair of driven drum portions 23 and 24 disposed in overlapping radially spaced relationship respectively with driving drums 14 and 15. Drum portions 23 and 24, respectively, have a series of axially extending splines 25 and 26 being circumferentially spaced about their inner surfaces. A pair of annular backing plates 27 and 28 have circumferentially spaced teeth on their outer annular surfaces in cooperating nonrotatable engagement respectively with splines 25 and 26 at opposite axial outer ends of drums 23 and 24 being respectively retained against axial outward movement thereon by snap rings 29 and 30. Two series of annular clutch disks 31 and 32, respectively, are axially slidable within drums 23 and 24 and have circumferentially spaced outer teeth engaged in driving relationship with splines 25 and 26. Disks 31 are interleaved with disks 19 to form one set or stack of clutch disks for one-half of the double acting clutch; and disks 32 are interleaved with disks 20 to form the other stack of clutch disks for the other half of the double acting clutch. A radial web portion 33 interconnects the drum portions 23 and 24 with an annular hub 34 which is mounted on shaft 7 being nonrotatably connected thereto as by a key, not shown, and being retained against axial movement thereon by snap rings 36 and 37.

Shaft 7 and driven member 22 form a pair of annular working cylinders, identified generally by reference numerals 38 and 39, which are separated by web portion 33. A double piston assembly, indicated generally by reference numeral 41, includes a pair of piston members 42 and 43 being slidably mounted respectively within working cylinders 38 and 39. Pistons 42 and 43, respectively, have annular flange portions 44 and 45 which have a fluid tight fit with shaft 7 by means of seal rings 46 and 47; have radially extending portions 48 and 49 connected respectively to annular flange portions 50 and 51 which have a fluid tight fit with hub 34 by means of seal rings 52 and 53; and also have radially extending portions 54 and 55 which are connected to portions 50 and 51 and which have a fluid tight fit with drums 23 and 24 by means of seal rings 56 and 57. Piston assembly 41 also includes three connecting rods 59 which are slidably carried in circumferentially spaced transverse bores 60 formed in web portion 33. Opposite ends of rods 59 have threaded reduced diameters for respectively receiving complementary bores 61 and 62 formed respectively in radial portions 54 and 55 of piston members 42 and 43. Bore portions 61 and 62 are retained upon rods 59 between seal washers 63 and nuts 64, the latter being in threaded engagement respectively with the opposite ends of connecting rods 59. It will be readily apparent that rods 59 serve as a means for fixedly tying pistons 42 and 43 together for unitary reciprocal movement. Piston assembly 41 also includes pairs of spring loaded centering devices 65 and 66 which are retained respectively in axially extending circumferentially spaced openings or pockets 67 and 68 formed respectively in radial portions 54 and 55. Each of the centering devices 65 and 66, respectively, includes cylinder members 69 and 70 having closed ends 71 and 72 which in the midposition of assembly 41 are held in abutting thrust transmitting relationship with web portion 33. Members 69 and 70 are slidably retained within pockets 67 and 68 by snap rings 73 and 74. Helical compression springs 76 and 77, which are carried respectively within pockets 67 and 68, between end portions 71 and 72 and the ends of the pockets, react in a manner to urge piston members 42 and 43, respectively, in an axial direction away from the web portion 33 which in effect serves to center piston assembly 41 in a midposition with engaging surfaces 78 and 79, respectively, out of thrust transmitting contact with either stack of clutch disks.

Annular flange portions 44 and 50 of piston 42, which are slidable respectively upon the shaft 7 and the outer surface of hub portion 34, and web 33 serve as partitioning means for dividing annular cylinder 38 into a fluid tight radially inner pressure chamber, identified by the reference character A, and a fluid tight radially outer pressure chamber, identified by the reference character B, with the radial portions 48 and 54, respectively, forming end walls presenting radial pressure exposed areas for chambers A and B. Annular flange portions 45 and 51 of piston 43, which are slidable respectively upon shaft 7 and the outer surface of hub 34, and web 33 serve as partitioning means for dividing cylinder 39 into a fluid tight radially inner pressure chamber, identified by reference character C, and a radially outer pressure chamber, identified by the reference character D, with the radial portions 49 and 55, respectively, forming end walls presenting radial pressure exposed areas for chambers C and D.

An axial bore 84 is provided in shaft 7 extending from one end thereof. A composite tube assembly, identified generally by reference numeral 85, includes tube members 87 and 88 carried within bore 84 being insertable from the open end thereof and being retained therein by a snap ring 86. Tube 87 has a portion of reduced diameter, identified generally by reference numeral 90, intermediate a pair of land portions 91 and 92 thereby forming an annular passageway 93 within bore 84. Tube 87 is maintained in spaced relationship from the dead end of bore 84 by means of an end plug 95, which is inserted into the far end of bore 84, and by tube 88, one end of which is in threaded engagement with plug 95 and the opposite end being pressed into a bore provided in land portion 91 having a fluid tight connection therewith. The portion of bore 84 intermediate land portion 91 and end plug 95 defines a cylinder, identified generally by reference numeral 96, for the spool valve assembly which is identified generally by reference numeral 97. Tube member 88 has a midportion 98 of greater diameter than the remaining portions. Spool valve assembly 97 includes a spool member 100 having an axial bore 101 slidably mounted upon midportion 98 of tube member 88. Spool member 100 has an area of reduced diameter, identified by reference numeral 102, intermediate a pair of piston portions 103 and 104 which are in slidable engagement with cylinder 96. Piston portions 103 and 104 cooperate with the surface of bore 84 to partition cylinder 96 into a pair of outer chambers 106 and 107 on opposite sides respectively of an annular chamber 108 formed about portion 102. The spool valve assembly 97 also includes a pair of spacer members 109 and 110 slidably carried upon tube 88 being interposed respectively between land portion 91 of tube 87 and piston portion 104 of spool 100; and between piston portion 103 of spool 100 and end member 95. A helical compression spring 113 is carried upon tube 88 and spacer 109 and acts between the radially flanged end portion of spacer 109 and the axial end of land portion 91. Spring 113 is preloaded to urge the outer face of the radially flanged end of spacer 109 into abutting relationship with a shoulder formed by midportion 98 on tube 88 and the axial end face of piston portion 104 of spool 100. A second helical compression spring 115 is carried on tube 88 and spacer 110 and acts between the axial face of end plug 95 and the radially flanged end portion of spacer 110. Spring 115 is preloaded to urge the outer face of the radially flanged end of spacer 110 into abutting relationship with a shoulder formed by midportion 98, on tube 88, and the axial end face of piston portion 103 of spool 100. Springs 113 and 115 and spacers 109 and 110 serve as a biasing means to maintain spool 100 in a centered or neutral position within cylinder 96.

A pair of fluid ports 120 and 121 are respectively formed in cylinder 96 communicating with end chambers 106 and 107 at opposite ends of spool 100. Ports 120 and 121 are connected respectively to chambers A and C by means of radially drilled holes 122 and 123 in shaft 7. A pair of fluid ports 125 and 126 are provided in cylinder 96 intermediate ports 120 and 121 and respectively communicate with chambers B and D by means of radial holes 127 and 128 both being drilled through shaft 7 and hub 34. One end of shaft 7 is rotatable within a collar member 129 which is provided with a pair of annular passages 131 and 132. Annular passage 131 communicates with end chamber 106 through radially drilled hole 133 in shaft 7, annular groove 134 and radial hole 135 in tube 87 and thence through the bore 136 of tube 87 and bore 137 of tube 88 and thence through radial openings 138 provided in the far end of tube 88. Annular passage 132 communicates with end chamber 107 through radially drilled hole 139 in shaft 7 opening into annular passageway 93 and thence through openings 140 in land portion 91.

A diagrammatically illustrated hydraulic system, indicated generally by the reference character 141, is of conventional design and construction and includes a hydraulic reservoir 142, a hydraulic pump 143 and a control valve 144 with a manual actuating lever 145 for selectively directing hydraulic fluid alternatively through conduits 147 and 148 which are connected to collar 129 for fluid communication respectively with passages 131 and 132.

*Operation*

Referring to Figs. 1 and 3, in Fig. 1 the actuator or piston assembly 41 is shown in a midposition with engaging surfaces 78 and 79 out of engagement with both stacks of clutch disks; and spool 100 is shown in a mid or neutral position. Assuming it is desired to actuate the left hand stack of clutch disks 19 and 31, the manually operated lever 145 of control valve 144 is shifted so as to direct pressurized hydraulic fluid from pump 143 through conduit 147 into annular passageway 131; and thence through hole 133, groove 134 and hole 135, bores 136 and 137, openings 138 into end chamber 106; and thence through port 120 and hole 122 into the inner chamber A and against the pressure exposed area of the radial end portion 48 of piston 42, as indicated by the arrows. As the pressurized fluid, acting upon the radial exposed area of portion 48, provides an axial force on piston 42 sufficient to overcome springs 77, working cylinder 38 will expand and piston assembly 41 will be displaced to the left bringing engaging surface 78 of piston member 42 into thrust transmitting engagement with the stack of clutch disks 19 and 31 tending to compress them into frictional engagement with each other. As cylinder 38 expands and piston assembly 41 moves to the left, cylinder 39 will contract and the hydraulic fluid which is trapped in outer chamber D will be transferred to outer chamber B through hole 128, fluid port 126 into annular chamber 108 and thence through fluid port 125 and hole 127. Also during leftward movement of assembly 41, hydraulic fluid is evacuated from pressure chamber C back to the reservoir 142 through hole 123, port 121, end chamber 107, opening 140, annular passage 93, hole 139, annular passageway 132, conduit 148, control valve 144 and return conduit 149.

Referring to Fig. 4, as the stack of clutch disks 19 and 31 tend to resist further compression and leftward movement of assembly 41 is checked, fluid pressure within pressure chamber A and end chamber 106 will tend to build up and to approach the level of the static output pressure being delivered by pump 143 of the fluid supply system 141 and when the pressure being directed against the pressure exposed face of piston portion 103 of spool 100 builds up to a predetermined level sufficient to overcome spring 113, spool member 100 and spacer 109 will move to the right until spacer 109 abuts the end face of land portion 91 which is the actuated position of spool 100. In this actuated position, transfer of fluid from chamber D to chamber B will be interrupted as piston portion 103 isolates fluid port 125 from fluid port 126 and alternatively opens fluid port 125 into end chamber 106 for fluid communication with inner chamber A through fluid port 120. Pressurized hydraulic fluid may now be directed simultaneously into both pressure chambers A and B and against the entire pressure exposed area of radial portions 48 and 54 of piston 42 in order to further expand cylinder 38 and force assembly 41 further to the left to fully compress clutch disks 19 and 31 into frictional torque transmitting engagement, thereby drivingly connecting driving member 8 with driven member 22 and shaft 7. To avoid a fluid lock in pressure chamber D after spool 100 closes off fluid port 126, it may be desirable to provide a suitable means such as a bleed hole 150 through which fluid may be exhausted into the clutch housing. When it is necessary to return the piston assembly 41 to the midposition out of engagement with either stack of disks, as shown in Fig. 1, the manual lever 145 of control valve 144 is returned to its neutral position whereby pressurized fluid from pump 143 is directed through return conduit 149 into the reservoir 142 rather than through either of conduits 147 or 148, whereupon spool 100 will immediately be returned by spring 113 to the mid or neutral position. With spool 100 in the neutral position piston assembly 41 will be returned to the midposition by springs 77, fluid in outer chamber B will be transferred to outer chamber D as assembly 41 moves to the right and fluid in inner chamber A will be returned to the reservoir.

Alternatively if it is desirable to shift the piston assembly 41 to the right to bring engaging surface 79 of piston 43 into thrust transmitting engagement with the right hand stack of clutch disks 20 and 32 in order to drivingly connect driving member 9 with driven member 22, the foregoing description of procedure for leftward shifting is reversed. Since this alternative operation will be readily apparent to those skilled in the art, it is not believed necessary to provide an additional detailed description.

Considering the foregoing construction from a general point of view it will be noted that driving drum 14, driven drum 23 and the stack of disks 19 and 31 form one complete clutch group; and driving drum 15, driven drum 24 and the stack of disks 20 and 32 form the other complete clutch group of the double acting clutch assembly 6 which is mounted upon shaft 7, the latter serving as a support member. The stacks of clutch disks and their associated drums are in effect a pair of axially spaced frictional gripping devices of the transmission, and piston assembly 41 serves as a pressure responsive actuator reciprocally mounted upon the support member 7 between the gripping devices. Actuator 41 is shiftable from a midposition into engagement with one or the other of the gripping devices alternatively by means of the hydraulic system 141 which includes reservoir 142, pump 143, control valve 144, conduits 147 and 148. The hydraulic system together with collar 129, a supply passage formed by holes 133 and 134, bores 136 and 137 and hole 122 and a supply passage formed by hole 139, passageway 93, openings 140 and hole 123, serves as a fluid pressure means for directing fluid into the working cylinders 38 and 39 alternatively in order to shift the actuator 41. It will be noted also that spool valve assembly including spool 100, spacers 109 and 110 and springs 113 and 115 serve as a flow regulating means which, in the neutral position of spool 100, permits transfer of fluid between the outer chambers B and D and which is responsive to a predetermined pressure within either supply passage of the fluid means to automatically interrupt fluid transfer and alternatively connect the inner and outer chambers of the working cylinders to which fluid pressure is being delivered by the fluid pressure means.

It will be noted further that the pressure exposed radial area of pistons 42 and 43 is greater in pressure chambers B and D than in pressure chambers A and C. When shifting the actuator 41 to the left, as illustrated in Figs. 3 and 4, the pressure acting initially on the smaller area within chamber A will produce a force sufficient to only partially compress the stack of disks 19 and 31 so that some torsional force will be transmitted therebetween. The time interval during which fluid acts only in chamber A allows pressure to build up so that when the spool valve assembly shifts and connects both chambers A and B with the fluid pressure means, the entire radial pressure area of piston 42 will be exposed to pressurized fluid. This results in a much greater force being exerted instantaneously upon piston 42 so that disks 19 and 31 may be fully compressed very rapidly and without undesirable grabbing. This smooth operation is due principally to the fact that the disks are already partially compressed when the full compressive force is applied.

From the foregoing detailed description it will be apparent that a new and improved mechanism for actuating a double acting clutch has been illustrated which has an extremely simple construction and which incorporates the feature of fluid transfer combined with the feature of time delay in order to provide a smooth, rapid and positive operation of a multiple disk clutch assembly.

It is to be understood that although only one embodiment of the present invention has been shown and described in detail, various changes and modifications may be used without departing from the spirit of the invention; and it is, therefore, not intended to limit any patent granted hereon otherwise than is necessitated by the scope of the appended claims.

What is claimed is:

1. Mechanism for engaging an axially spaced pair of frictional gripping devices of a transmission comprising a support member; an actuator member mounted on said support member for axial reciprocable movement between said pair of gripping devices, said actuator having axially outer end portions; partitioning means associated with said support and said actuator to form a first and second pair of pressure chambers respectively at opposite axial ends of said actuator, the end portions of said actuator defining end walls for said pairs of pressure chambers; a fluid port for each of said pressure chambers; a fluid pressure means including a fluid supply passage for delivering pressurized fluid to the fluid port of one of the pressure chambers of said first pair for shifting said actuator in one axial direction into engagement with one of said gripping devices; a fluid transfer passage interconnecting the fluid ports of one of said second pair of pressure chambers with the other of said first pair of pressure chambers; and pressure sensitive regulating means for controlling fluid flow through said fluid transfer passage, said regulating means being responsive to a predetermined pressure within said one pressure chamber of said first pair for isolating the fluid port of said one of said second pair of pressure chambers from the fluid port of said other pressure chamber of said first pair and for alternatively connecting the fluid ports of said first pair of pressure chambers in fluid communication with each other whereby fluid pressure from said fluid pressure means may be directed into both of said first pair of pressure chambers.

2. Mechanism for engaging an axially spaced pair of frictional gripping devices of a transmission comprising a support member; an actuator member mounted on said support member for axial reciprocable movement between said pair of gripping devices; partitioning means associated with said support and said actuator to form two pairs of pressure chambers whereby one axial end of said actuator defines an end wall for a first and second pressure chamber and the opposite axial end of said actuator defines an end wall for a third and a fourth pressure chamber; fluid pressure means including a fluid supply passage for conducting pressurized fluid into said first pressure chamber for shifting said actuator in one axial direction into engagement with one of said gripping devices; fluid passage means connecting said second pressure chamber with said fourth pressure chamber for transferring fluid therebetween during axial shifting of the actuator; pressure sensitive regulating means associated with said fluid passage means and said fluid supply passage and being responsive to a predetermined pressure within said first pressure chamber for interrupting fluid transfer from said fourth pressure chamber and for alternatively establishing fluid communication between said fluid supply passage and said fluid transfer passage whereby pressurized fluid may be directed into each of said first and second pressure chambers simultaneously for urging said actuator in said one axial direction.

3. Mechanism for engaging an axially spaced pair of frictional gripping devices of a transmission comprising a support member; an actuator member mounted on said support member for axial reciprocable movement between said pair of gripping devices; partitioning means associated with said support and said actuator to form two pairs of pressure chambers whereby one axial end of said actuator defines an end wall having a pressure exposed radial area for a first and second pressure chamber and the opposite axial end of said actuator defines an end wall having a pressure exposed radial area for a third and a fourth pressure chamber, each of the exposed radial areas in said second and fourth pressure chambers being larger than each of those in said first and third pressure chambers; fluid pressure means including a fluid supply passage for conducting pressurized fluid against said exposed radial area in said first pressure chamber to shift said actuator in one axial direction into engagement with one of said gripping devices; spool valve means for establishing fluid communication between said second pressure chamber and said fourth pressure chamber for transferring fluid therebetween during axial shifting of the actuator, and being responsive to a predetermined pressure in said first pressure chamber for disrupting fluid transfer by isolating said fourth pressure chamber from fluid communication with said second pressure chamber and for alternatively connecting the latter in fluid communication with said first pressure chamber whereby pressurized fluid may be directed against said exposed radial area in each of said first and second pressure chambers simultaneously.

4. Mechanism for engaging an axially spaced pair of frictional gripping devices of a transmission comprising a support member; an actuator member mounted on said support member for axial reciprocable movement between said pair of gripping devices; partitioning means associated with said support and said actuator to form two pairs of pressure chambers whereby one axial end of said actuator defines an end wall having a pressure exposed radial area for a first and a second pressure chamber and the opposite axial end of said actuator defines an end wall having a pressure exposed radial area for a third and a fourth pressure chamber, each of the exposed radial areas in said second and fourth pressure chambers being larger than each of those in said first and third pressure chambers; fluid pressure means including a fluid supply passage for conducting pressurized fluid against said exposed radial area in said first pressure chamber for shifting said actuator in one axial direction into engagement with one of said gripping devices; fluid passage means connecting said second pressure chamber with said fourth pressure chamber for transferring fluid therebetween during axial shifting of the actuator; pressure sensitive regulating means associated with said fluid passage means and said fluid supply passage, and being responsive to a predetermined pressure in said first pressure chamber for isolating said second pressure chamber from fluid communication with said fourth pressure chamber and for alternatively connecting said fluid supply passage in fluid communication with said fluid transfer passage whereby pressurized fluid may be directed against said exposed radial area in each of said first and second pressure chambers simultaneously.

5. Mechanism for engaging an axially spaced pair of frictional gripping devices of a transmission comprising a support member; an actuator member mounted on said support member for axial reciprocable movement between said pair of gripping devices; partitioning means associated with said support and said actuator to form two pairs of pressure chambers whereby one axial end of said actuator defines an end wall for a first and second pressure chamber and the opposite axial end of said actuator defines an end wall for a third and a fourth pressure chamber; a cylinder on said support; a fluid port on one end of said cylinder in fluid communication with said first pressure chamber; fluid pressure means for delivering pressurized fluid to said one end of said cylinder; a fluid port in said cylinder for each of said second and fourth pressure chambers; a flow regulating means including a piston reciprocable in said cylinder for connecting the fluid ports of said second and fourth pressure chambers, said piston being responsive to a predetermined pressure in said one end of the cylinder for isolating the fluid port of said fourth pressure chamber from the fluid port of said second pressure chamber and alternatively opening the latter to fluid communication with said one end of the cylinder whereby fluid pressure from said fluid pressure means may be directed into said first and second pressure chambers simultaneously.

6. Mechanism for engaging an axially spaced pair of frictional gripping devices for a transmission comprising a support member; an actuator member mounted on said support member for axial reciprocable movement between said pair of gripping devices; partitioning means associated with said support and said actuator to form two pairs of pressure chambers whereby one axial end of said actuator defines an end wall for a first and second pressure chamber and the opposite axial end of said actuator defines an end wall for a third and a fourth pressure chamber; a fluid pressure means including a fluid supply passage for delivering pressurized fluid to said first pressure chamber; a cylinder on said support in fluid communication with said fluid supply passage; a fluid port in said cylinder for each of said second and fourth pressure chambers; a piston member reciprocable within said cylinder between a neutral and an actuated position, said piston member and cylinder having cooperating surfaces for interconnecting the fluid ports of said second and fourth pressure chambers in said neutral position and for isolating the fluid port of said fourth pressure chamber from the fluid port of said second pressure chamber and alternatively establishing fluid communication between the latter and said fluid pressure means in said actuated position; and biasing means for yieldably maintaining said piston member in said neutral position, said piston member being shiftable from said neutral position into said actuated position in response to a predetermined fluid pressure within said fluid supply passage.

7. Mechanism for engaging an axially spaced pair of frictional gripping devices of a transmission comprising a support member; an actuator member mounted on said support member for axial reciprocable movement between said pair of gripping devices; partitioning means associated with said support and said actuator to form two pairs of pressure chambers whereby one axial end of said actuator defines an end wall for a first and a second pressure chamber and the opposite axial end of said actuator defines an end wall for a third and a fourth pressure chamber; a cylinder on said support; a fluid port in said cylinder for each of said pressure chambers; a valve member reciprocable in said cylinder and shiftable from a neutral to an actuated position, said valve member having a pair of piston sections and a section of reduced diameter intermediate said pair of piston sections, the latter cooperating with said cylinder to form a pair of end chambers respectively at opposite ends of said valve member, and an annular chamber between the piston sections; a fluid pressure means including a fluid supply passage for delivering pressurized fluid to one of said end chambers, in said neutral position the fluid ports of said first and third pressure chambers being in fluid communication respectively with said pair of end chambers, and the fluid ports of said second and fourth pressure chambers being in fluid communication respectively with said annular chamber, in said actuated position the fluid port of said fourth pressure chamber being isolated from the fluid port of said second pressure chamber, the latter being opened to fluid communication with said one end chamber; and biasing means for yieldably maintaining said valve member in said neutral position, said valve member being shiftable from said neutral position into said actuated position in response to a predetermined fluid pressure in said one end chamber.

8. A double acting fluid operated clutch mechanism comprising a support member; a pair of multiple disk friction means in axially spaced relation on said support; a fluid pressure responsive actuator member mounted coaxially with and reciprocable on said support between said pair of friction means for alternatively engaging one or the other thereof; partition means on said support coacting with the actuator to form a radially inner pressure chamber and a corresponding radially outer pressure chamber at each axial end of said actuator; fluid pressure means including a fluid supply passage for selectively conducting pressurized fluid into one of said inner pressure chambers for shifting said actuator in an axial direction to engage one of said friction means; a fluid port for each of said pressure chambers; a spool valve means on said support for establishing fluid communication between the fluid ports of said outer pressure chambers, said spool valve means also having fluid communication with said one inner pressure chamber and being responsive to a predetermined pressure therein for isolating the fluid ports of said outer pressure chambers from each other and alternatively establishing fluid communication between said one inner pressure chamber and the corresponding outer pressure chamber by interconnecting their respective fluid ports.

9. A double acting fluid operated clutch for a transmission comprising a transmission shaft; a pair of multiple disk clutch means mounted in axially spaced relation on said shaft; an actuator member reciprocably mounted on said shaft between said pair of clutch means for selectively engaging one or the other thereof; partition means on said shaft coacting with the actuator to form a radially inner pressure chamber and a corresponding radially outer pressure chamber at each axial end of said actuator; a fluid port for each of said pressure chambers; fluid pressure means including fluid supply passages in said shaft for selectively conducting pressurized fluid into one or the other of the fluid ports of said inner pressure chambers for shifting said actuator axially to alternatively engage one or the other of said clutch means; a spool valve means carried within said shaft for establishing fluid communication between the fluid ports of said outer pressure chambers during axial shifting of said actuator, said spool valve means having fluid communication with the inner pressure chambers and being responsive to a predetermined pressure in one of said inner pressure chambers for isolating fluid ports of said outer pressure chambers from each other and alternatively interconnecting the fluid port of said one inner pressure chamber with the fluid port of the corresponding outer pressure chamber.

10. A double acting fluid operated clutch for a transmission comprising a transmission shaft; a pair of multiple disk clutch means mounted in axially spaced relation on said shaft; an actuator member reciprocable on said shaft between said pair of clutch means for selectively engaging one or the other thereof; partition means on said support coacting with the actuator to form a radially inner pressure chamber and a corresponding radially outer pressure chamber at each axial end of said actuator; fluid pressure means including fluid supply passages in said shaft for selectively conducting pressurized fluid into one or the other of said radial inner pressure chambers for shifting said actuator in an axial direction to engage one or the other of said clutch means alternatively; and spool valve means including a cylinder formed within said shaft, a first fluid port in each end of said cylinder in fluid communication respectively with said inner pressure chambers, a pair of second fluid ports in said cylinder between the first fluid ports and in fluid communication respectively with said outer pressure chambers, said spool valve means also including a plunger reciprocable within said cylinder for interconnecting said second fluid ports during axial shifting of said actuator and being responsive to a predetermined pressure within said fluid pressure means for isolating said second fluid ports from each other and alternatively establishing fluid communication between a first and second fluid port respectively of one of the inner pressure chambers and a corresponding outer pressure chamber.

11. A double acting fluid operated clutch for a transmission comprising a transmission shaft; a pair of multiple disk clutch means mounted in axially spaced relation on said shaft; an actuator member reciprocable on said shaft between said pair of clutch means for selectively engaging one or the other thereof; partition means on said support coacting with the actuator to form a radially inner pressure chamber and a corresponding radially outer pressure chamber at each axial end of said actuator; spool valve means including a cylinder formed within said shaft; a first fluid port at each end of said cylinder in fluid communication respectively with said inner pressure chambers; a pair of second fluid ports intermediate the ends of said cylinder in fluid communication respectively with said outer pressure chambers; fluid pressure means including fluid supply passages in said shaft for selectively conducting pressurized fluid into one or the other end of said cylinder alternatively, said spool valve means also including a plunger reciprocable within said cylinder between a neutral and an actuated position, said plunger interconnecting said second fluid ports in said neutral position, and in said actuated position isolating said second fluid ports from each other and alternatively establishing fluid communication between the first and second fluid ports respectively of one of the inner pressure chambers and a corresponding outer pressure chamber, said plunger member being shiftable from said neutral position into said actuated position in response to a predetermined fluid pressure within said one inner pressure chamber.

12. In a power shift transmission a double acting fluid operated clutch, the combination comprising: a rotatable transmission shaft; a pair of driving drums rotatably mounted in axially spaced relationship on said shaft; a driven member nonrotatably carried on said shaft intermediate said driving drums and including a pair of annular driven drums disposed respectively in overlapping relationship with said driving drums; a first and second stack of clutch disks respectively including a plurality of single disks in splined engagement with the respective driving drums, and interleaved with a plurality of single disks in splined engagement with said driven drums, said disks being axially slidable into frictional engagement with each other; a central radial web portion on said driven member disposed between said annular driven drum and said shaft; a pair of working cylinders respectively formed within said driven member and on opposite sides of said web portion; an actuator mounted coaxially with said shaft and including a pair of pistons reciprocable in said cylinders respectively, said actuator also including means for interconnecting said pistons for unitary axial movement, said actuator being axially shiftable to compress each stack of clutch disks alternatively and having an intermediate position out of contact with both stacks of disks; partitioning means associated with said pistons to divide each of said working cylinders into a radially inner and a radially outer pressure chamber; fluid pressure means including fluid supply passages in said shaft for selectively delivering pressurized fluid into each inner pressure chamber alternatively for expanding one of the working cylinders and axially shifting said actuator; spool valve means on said shaft for establishing fluid communication between said outer pressure chambers during delivery of pressurized fluid to the inner pressure chamber of one of said working cylinders, said spool valve means being responsive to a predetermined pressure in the inner pressure chamber of said one working cylinder for interrupting fluid communication between said outer pressure chambers and alternatively establishing fluid communication between the inner and outer pressure chambers of said one working cylinder.

13. In a power shift transmission a double acting fluid operated clutch the combination comprising: a rotatable transmission shaft; a pair of driving drums rotatably mounted in axially spaced relationship on said shaft; a driven member nonrotatably carried on said shaft intermediate said driving drums and including a pair of annular driven drums disposed respectively in overlapping relationship with the driving drums; a first and second stack of clutch disks including a plurality of single disks in splined engagement with the respective driving drums and interleaved with a plurality of single disks in splined engagement with said driven drums, the disks of each stack being axially slidable into frictional engagement with each other; a central radial web portion on said driven member extending between said shaft and said annular driven drums, a working cylinder formed within said driven member on opposite sides of said web portion respectively; an actuator coaxially carried on said shaft and including a pair of pistons reciprocable in said cylinders respectively, said actuator also including means for interconnecting said pistons for unitary axial movement, said actuator being operative to compress each stack of clutch disks alternatively and having an intermediate position out of contact with both stacks of disks; partitioning means associated with said pistons to divide each of said working cylinders into a radially inner and a radially outer pressure chamber; an axial bore in said shaft; spool valve means including a plunger slidable within said bore between a neutral and actuated position; a pair of end chambers formed respectively in said bore at opposite ends of said plunger; a first fluid port in each of said end chambers respectively in fluid communication with an inner pressure chamber; fluid pressure means including a pair of fluid supply passages in said shaft for respectively delivering pressurized fluid into each of said end chambers alternatively; a pair of second fluid ports in said bore in fluid communication respectively with said outer pressure chambers, in said neutral position said plunger being adapted to interconnect said second fluid ports, and in said actuated position being adapted to isolate said second fluid ports from each other and alternatively connect a first and second fluid port respectively of the inner and outer pressure chamber of one of said working cylinders, said plunger being shiftable into said actuated position in response to a predetermined pressure within the end chamber communicating with the inner chamber of said one working cylinder.

14. In a power shift transmission a double acting fluid operated clutch the combination comprising: a rotatable transmission shaft; a pair of driving drums rotatably mounted in axially spaced relationship on said shaft; a driven member including a hub portion nonrotatably carried on said shaft intermediate said driving drums and including an annular flange portion disposed in overlapping relationship with said driving drums, and also including a central radially extending web portion interconnecting said hub and said annular flange portion; a first and second stack of clutch disks respectively including a plurality of single disks in splined engagement with the respective driving drums and interleaved with a plurality of single disks in splined engagement with said annular flange portion, the disks of each stack being axially slidable into frictional engagement; a pair of annular working cylinders formed respectively within said driven member between said annular flange and said shaft on each axial side of said web portion; an actuator including a pair of pistons reciprocable respectively in said working cylinders and including means passing through said web portion to interconnect said pistons for unitary axial movement, said actuator being operative to compress each stack of clutch disks alternatively and having an intermediate position out of contact with both stacks of disks; biasing means for yieldably maintaining said actuator in said intermediate position; flange portions on said pistons cooperating respectively with said hub portion to divide each of said working cylinders into a radially inner and a radially outer pressure chamber so that the pressure exposed radial area of said pistons in said outer chambers are greater than in said inner chambers; an axial bore in said shaft; a spool slidable within said bore between a neutral and an actuated position; piston portions on opposite ends of said spool forming a pair of end chambers within said bore; a midportion of reduced diameter between said piston portions forming an annular chamber with said bore; a fluid port in each of said end chambers connected in permanent communication respectively with said pair of inner pressure chambers; fluid pressure means including a pair of fluid supply passages in said shaft connected respectively to said end chambers, said pressure means also including a manually operated control valve connected to said pair of fluid supply passages for delivering pressurized fluid into each of said end chambers alternatively; a pair of second fluid ports in said bore respectively for said outer pressure chambers, in the neutral position of said spool, each of said second fluid ports communicates with said annular chamber, and in said actuated position said spool connecting only one of said second fluid ports with said annular chamber and connecting the other of said second fluid ports with one of said end chambers thereby establishing fluid communication between an inner and outer pressure chamber of one of said working cylinders as pressurized fluid is being supplied thereto; and biasing means reacting axially between said shaft and opposite ends of said spool for yieldably maintaining the latter in said neutral position, said spool being automatically shiftable into said actuated position in response to a predetermined pressure within said one end chamber.

15. Mechanism for actuating a double acting clutch the combination comprising: a support; a pair of axially spaced frictional gripping devices on said support; an actuator axially reciprocable on said support between said gripping devices, said actuator having a pair of pressure chambers at each axial end thereof; fluid pressure means for directing pressurized fluid into one of the pressure chambers of one of said pairs; and valve means for permitting transfer of fluid between the other pressure chamber of said one pair and one of the pressure chambers of the other of said pair during axial shifting of said actuator, said valve means being responsive to a predetermined pressure within said fluid pressure means for interrupting said fluid transfer and alternatively establishing fluid communication between the pressure chambers of said one pair.

References Cited in the file of this patent

UNITED STATES PATENTS

| | | |
|---|---|---|
| 2,386,220 | Lawler | Oct. 9, 1945 |
| 2,464,538 | Vanderzee | Mar. 15, 1949 |
| 2,632,544 | Hockert | Mar. 24, 1953 |
| 2,868,341 | Snoy | Jan. 13, 1959 |
| 2,920,732 | Richards et al. | Jan. 12, 1960 |